(12) United States Patent
Ventimiglia et al.

(10) Patent No.: US 11,748,407 B2
(45) Date of Patent: Sep. 5, 2023

(54) ACTIVITY LEVEL BASED MANAGEMENT AND UPLOAD OF RIDE MONITORING DATA OF RIDES OF A MOBILITY SERVICE PROVIDER

(71) Applicant: Robert Bosch GmbH, Stuttgart (DE)

(72) Inventors: Philip Ventimiglia, Northville, MI (US); Stefan Weissert, Royal Oak, MI (US); Christian Stresing, Hildesheim (DE); Christian Neumann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 17/068,068

(22) Filed: Oct. 12, 2020

(65) Prior Publication Data

US 2022/0114212 A1 Apr. 14, 2022

(51) Int. Cl.
*G06F 16/783* (2019.01)
*G06V 20/59* (2022.01)
(Continued)

(52) U.S. Cl.
CPC ........ *G06F 16/784* (2019.01); *G06F 16/7834* (2019.01); *G06V 20/40* (2022.01); *G06V 20/56* (2022.01); *G06V 20/59* (2022.01); *G07C 5/008* (2013.01); *G07C 5/0841* (2013.01); *G07C 5/0866* (2013.01)

(58) Field of Classification Search
CPC ... G06F 16/784; G06F 16/7834; G06V 20/59; G06V 20/40; G06V 20/56; G07C 5/008; G07C 5/0841; G07C 5/0866
See application file for complete search history.

(56) References Cited

U.S. PATENT DOCUMENTS

| | | |
|---|---|---|
| 8,520,070 B1 | 8/2013 | Englander et al. |
| 9,984,293 B2 | 5/2018 | Hodulik et al. |
| | (Continued) | |

FOREIGN PATENT DOCUMENTS

WO 2019/133970 A2 7/2019

OTHER PUBLICATIONS

Rodriguez-Moreno, I. et al., "Video Activity Recognition: State-of-the-Art," Sensors, 2019 (25 pages).
(Continued)

*Primary Examiner* — James J Lee
*Assistant Examiner* — Steven Vu Nguyen
(74) *Attorney, Agent, or Firm* — Maginot, Moore & Beck LLP

(57) ABSTRACT

A system and method are disclosed for monitoring rides in a vehicle in which a driver of the vehicle picks up a rider at a pickup location and drives the rider to a drop-off destination. The system includes at least one sensor arranged in the vehicle and configured to capture sensor data during the rides, a transceiver configured to communicate with a personal electronic device of a driver of the vehicle, a non-volatile memory configured to store data; and a processor. The system captures sensor data during a ride, determines an activity index indicating an activity level within the vehicle during the ride, and stores the sensor data captured during the ride with the activity index as metadata. In response to an upload request, the system uploads sensor data depending on the activity level.

14 Claims, 7 Drawing Sheets

(51) Int. Cl.
*G06V 20/40* (2022.01)
*G06V 20/56* (2022.01)
*G07C 5/00* (2006.01)
*G07C 5/08* (2006.01)

(56) References Cited

U.S. PATENT DOCUMENTS

| | | | |
|---|---|---|---|
| 10,196,071 | B1 | 2/2019 | Rowson et al. |
| 10,246,014 | B2 | 4/2019 | Levkova et al. |
| 2003/0154009 | A1 | 8/2003 | Basir et al. |
| 2018/0341706 | A1* | 11/2018 | Agrawal ............... G06V 20/597 |
| 2019/0028444 | A1 | 1/2019 | McClendon |
| 2020/0349345 | A1* | 11/2020 | Hodge ................... G06Q 50/30 |
| 2021/0201934 | A1* | 7/2021 | Lyu ......................... G06Q 50/30 |
| 2022/0020230 | A1* | 1/2022 | Tai ........................ G08G 1/0133 |
| 2022/0254199 | A1* | 8/2022 | Tsukahara ............... G07C 5/008 |

OTHER PUBLICATIONS

Härmä, A. et al., "Automatic Surveillance of the Acoustic Activity in our Living Environment," IEEE, 2005 (4 pages).
International Search Report corresponding to International Patent Application No. PCT/EP2021/076634, dated Jan. 21, 2022 (5 pages).

* cited by examiner

ACTIVITY LEVEL BASED MANAGEMENT AND UPLOAD OF RIDE MONITORING DATA OF RIDES OF A MOBILITY SERVICE PROVIDER

FIELD

The device and method disclosed in this document relates to in-vehicle monitoring and, more particularly, to activity level based management and upload of ride monitoring data of rides of a mobility service provider.

BACKGROUND

Unless otherwise indicated herein, the materials described in this section are not admitted to be the prior art by inclusion in this section.

Mobility service providers will play in increasingly important role in transportation as fewer people own their own vehicles and rely more on on-demand mobility services for their transportation needs. Some mobility service providers, such as ride share and taxi service providers, facilitate transactions between strangers in which a rider requests a ride using a smart phone application or by some other means and a driver picks up the rider and transports the rider to a desired destination in exchange for a fare. Naturally, there are occasions when disputes arise between the rider and the driver or between riders during the ride, or when some other anomalous event occurs during the ride. Accordingly, it would be beneficial to provide a system for monitoring rides provided by such mobility service providers. Additionally, it would be advantageous if the monitoring maintained the privacy of the drivers and riders to the extent possible, particularly for the majority of rides in which no dispute or other anomalous event occurs.

SUMMARY

A system for monitoring rides in a vehicle is disclosed. The system comprises at least one sensor arranged in the vehicle and configured to capture sensor data during the rides. The system further comprises a non-volatile memory configured to store data. The system further comprises a processor operatively connected to the at least one sensor and the memory. The processor is configured to receive sensor data from the at least one sensor captured during a ride in which the driver picks up a rider at a pickup location and drives the rider to a drop-off destination. The processor is further configured to determine an activity index indicating an activity level within the vehicle during the ride based on the sensor data captured during the ride. The processor is further configured to store, in the non-volatile memory, the sensor data captured during the ride, the activity index being stored in metadata of the sensor data captured during the ride.

A method for monitoring rides in a vehicle is disclosed. The method comprises capturing, with at least one sensor arranged in the vehicle, sensor data during a ride in which a driver of the vehicle picks up a rider at a pickup location and drives the rider to a drop-off destination. The method further comprises determining an activity index indicating an activity level within the vehicle during the ride based on the sensor data captured during the ride. The method further comprises storing the sensor data captured during the ride in a non-volatile memory, the activity index being stored in metadata of the sensor data captured during the ride.

BRIEF DESCRIPTION OF THE DRAWINGS

The foregoing aspects and other features of the system and method are explained in the following description, taken in connection with the accompanying drawings.

DETAILED DESCRIPTION

Figure 1:
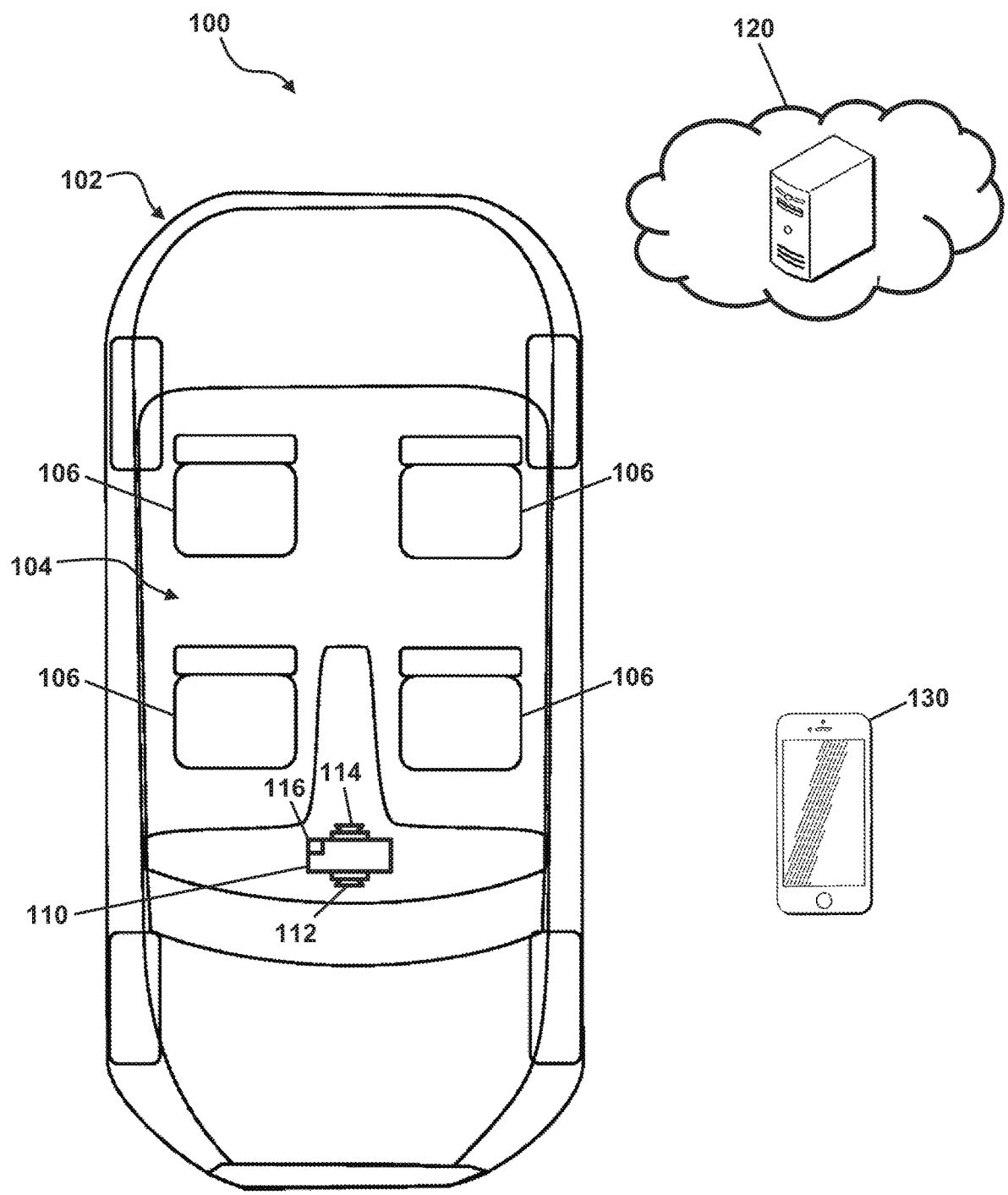
FIG. 1 shows a system for monitoring rides provided by a mobility service provider using a vehicle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows an exemplary embodiment of a system 100 for monitoring rides provided by a mobility service provider using a vehicle 102. Non-limiting examples of such mobility service providers include Lyft™ and Uber™. The system 100 comprises a monitoring device 110 and a cloud storage backend 120. The monitoring device 110 includes a plurality of sensors including, for example, a front-facing exterior camera 112, a cabin-facing interior camera 114, and at least one interior microphone 116. The monitoring device 110 is configured to record data from the sensors during rides in the vehicle 102 and to store the recorded data in a local storage device. In the event of dispute or other anomalous event, the recorded data may be uploaded to the cloud storage backend 120 for further review by an operator or administrator of the mobility service provider.

In the illustrated embodiment of FIG. 1, the vehicle 102 is in the form of an automobile having a cabin 104, which is a typically closed room for accommodating passengers. In the illustrated embodiment, the cabin 104 includes four seats 106 including a driver's seat and multiple passengers' seats. However, the cabin 104 may include more or less seats depending on the configuration and type of the vehicle 102. The vehicle 102 also includes one or more doors (not shown) enabling passengers to access the cabin 104 and the seats 106. In addition, the vehicle 102 may include a rear hatch (not shown) enabling a user to access a cargo storage area of the vehicle 102, for example a trunk or storage space behind the rear seats.

The monitoring device 110 is arranged within the cabin 104 such that the interior camera 114 has a view of all or most of the seats 106 within the cabin 104 and such that the exterior camera 112 has a view of the road ahead of the vehicle 102. In at least one embodiment, the monitoring device 110 is in the form of a retrofit device that is attached to a dash or windshield of the vehicle and in which all or most of the components thereof are contained within an integrated package. However, in alternative embodiments, the monitoring device 110 may be natively or otherwise integrated with the vehicle 102 and the components thereof, for example the sensors, may be distributed throughout the vehicle 102.

The system 100 is configured to operate in conjunction with a mobility service provider application that is executed on a personal electronic device 130, such as a smart phone, in the possession of the driver of the vehicle 102. Non-limiting examples of similar mobility service provider applications include the "Lyft Driver" application by Lyft™ and the "Uber Driver" application by Uber™, which are available on many smart phone and tablet computing platforms. Such mobility service provider applications may, for example, enable the driver to receive ride requests that are initiated by potential riders using a corresponding mobility service provider application on a personal electronic device of the rider. Upon receiving a ride request, the driver may opt to perform the requested ride in exchange for a fare. Generally, performance of each ride consists of driving the vehicle 102 to a pick-up location at which the rider is located, accepting the rider into the vehicle 102, driving the vehicle 102 to a desired drop-off destination, and stopping at the drop-off destination to allow the rider to disembark. Upon completion of the ride, the rider is generally charged a fare by the mobility service provider, some portion of which is provided to the driver.

During each ride, the monitoring device 110 is configured to record sensor data, at least including exterior video from the front-facing exterior camera 112, interior video from the cabin-facing interior camera 114, and interior audio from the interior microphone 116. The monitoring device 110 is advantageously configured to annotate the recorded sensor data with useful metadata about each particular ride. As an example, the recorded sensor data can be stored with metadata identifying the particular ride, driver, and rider, and with timestamps identifying a ride hail time, pick-up time, and drop-off time. To this end, the monitoring device 110 is configured to communicate with the personal electronic device 130, in particular with the mobility service provider application on the personal electronic device 130, in order to obtain information about each particular ride provided by the driver using the mobility service provider application.

The sensor data for each ride is stored in a local memory of the monitoring device 110. The sensor data is stored in one or more ring buffers such that, as new sensor data corresponding to the latest rides are recorded, the sensor data corresponding to the oldest rides are deleted. In at least one embodiment, sensor data corresponding to a particular ride or a particular portion of a ride can be tagged for longer term storage in a separate safe storage table if the data is expected to be of higher relevance to resolving disputes by the operator or administrator of the mobility service provider. Such data can, for example, be tagged for longer term storage by the monitoring device 110 with the aid of an algorithm that processes the sensor data to determine an activity level within the cabin 104. Particular rides or particular portions of a ride having a high activity level within the cabin 104 can be automatically tagged for longer term storage by the monitoring device 110.

In limited circumstances, the recorded sensor data is uploaded to the cloud storage backend 120 for further review by an operator or administrator of the mobility service provider. Particularly, sensor data of a particular ride or of a particular portion of a ride will be uploaded to the cloud storage backend 120 only in response to a triggering event. Exemplary triggering events may include the vehicle 102 being involved in an accident during the ride, the rider or the driver requesting the sensor data be uploaded for the ride, the rider or the driver filing a support ticket with the mobility service provider with respect to the ride, and a backend request from the mobility service provider. In this way, most recorded sensor data is never uploaded to the cloud storage backend 120 or made available for viewing by any party, thereby improving the privacy of the system 100.

Monitoring Device

Figure 2:
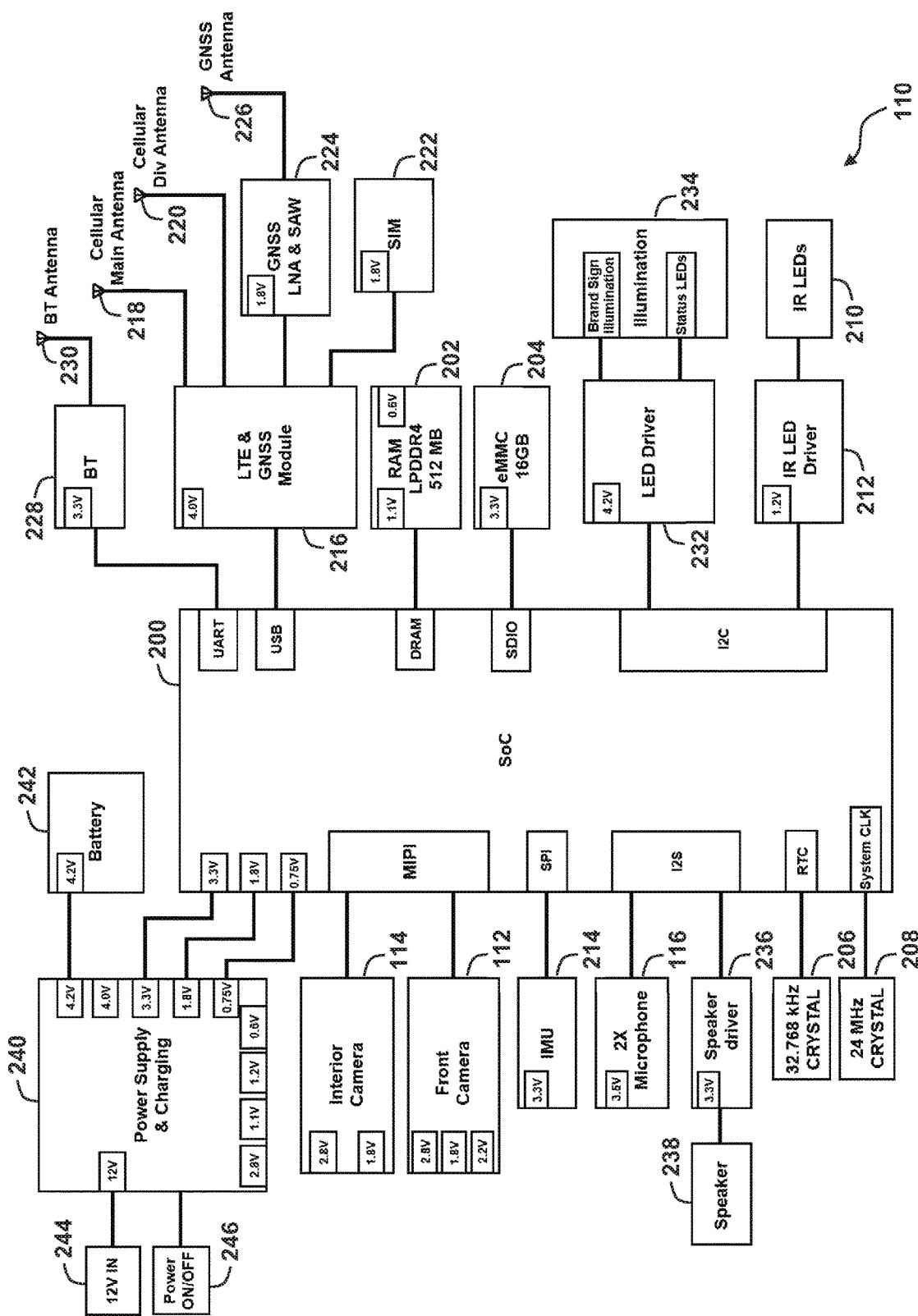
FIG. 2 shows exemplary hardware components of the monitoring device.

With reference to FIG. 2, exemplary components of the monitoring device 110 are described. In the illustrated embodiment, the monitoring device 110 comprises at least one processor 200 and associated memories 202, 204. Additionally, the processor 200 is operatively connected to a plurality of sensors, a plurality of transceivers, a plurality of output devices, and to a power supply. It will be recognized by those of ordinary skill in the art that a "processor" includes any hardware system, hardware mechanism or hardware component that processes data, signals or other information. Accordingly, the processor 200 may include a system with a central processing unit, graphics processing units, multiple processing units, dedicated circuitry for achieving functionality, programmable logic, or other processing systems.

In at least one embodiment, the processor 200 takes the form of a system on a chip (SoC) 200 having at least one central processing unit (CPU), such a quad-core ARM Cortex-A53 operating at, for example, 1 GHz. The system on a chip 200 may comprise dedicated processors or circuits for video encoding, e.g., h.264 and h.265 and for multiple resolution streams. Additionally, the system on a chip 200 may comprise dedicated processors or circuits for data encryption, e.g., Advanced Encryption Standard (AES), Triple DES (3DES or TDES) or Triple Data Encryption Algorithm (TDEA or Triple DEA), Secure Hash Algorithm 1 (SHA-1), and/or MD5 message-digest algorithm. The system on a chip 200 may comprise a variety of data and peripheral interfaces, e.g., Mobile Industry Processor Interface (MIPI), Serial Peripheral Interface (SPI), Inter-Integrated Circuit ($I^2C$ or I2C), Inter-IC Sound ($I^2S$ or I2S), Secure Digital Input Output (SDIO), Dynamic random-access memory (DRAM), Universal Serial Bus (USB), and universal asynchronous receiver-transmitter (UART). Finally, system on a chip 200 may comprise a real-time clock (RTC) and a system clock (CLK), generated by, for example, a 32.768 kHz crystal oscillator 206 and 24 MHz crystal oscillator 208, respectively.

The memories 202, 204 may be of any types of devices capable of storing information accessible by the processor 200, such as a flash memory card, ROM, RAM, hard drives, discs, or any of various other computer-readable medium serving as volatile or non-volatile data storage devices, as will be recognized by those of ordinary skill in the art. In particular, the memories 202, 204 at least comprise a volatile memory 202 and a non-volatile memory 204. The volatile memory 202 may, for example, comprise Low-Power Double Data Rate Synchronous Dynamic Random Access Memory (LPDDR SDRAM), in particular LPDDR4, that connects to the processor 200 (e.g., via a DRAM interface) and has a capacity of, for example, 512 MB. The non-volatile memory 204 may, for example, comprise embedded MultiMediaCard (eMMC) memory that connects to the processor 200 (e.g., via SDIO) and has a capacity of, for example, 16 GB.

The monitoring device 110 includes the exterior camera 112 and the interior camera 114, discussed above, which connect to the processor 200 (e.g., via MIPI). The exterior camera 112 and interior camera 114 are configured to capture video of the environment towards which they are oriented, i.e., the road ahead of the vehicle 102 and the interior cabin 104, respectively. The cameras 112 and 114 comprise image sensors configured to capture video with, for example, a 1080p resolution at 30 frames-per-second, with a 720p resolution at 60 frames-per-second, or both. The captured video takes the form of a sequence of image frames, each of which comprises a two-dimensional array of pixels. Each pixel has corresponding photometric information (i.e., intensity, color, and/or brightness). In one embodiment, the image sensor of the exterior camera 112 is an RGB image sensor with an IR cut filter. In one embodiment, the image sensor of the interior camera is an RGB image sensor with an IR band pass filter configured, for example, to pass infrared light having a wavelength corresponding to associated IR LEDs 210 and IR LED driver 212 (e.g., 850 nm). In one embodiment, the exterior camera 112 and interior camera 114 have, for example, image sensor sizes of 1/2.7" and 1/2.9", respectively. In one embodiment, the exterior camera 112 and interior camera 114 have, for example, lens fields of view of −140° and −150°, respectively.

The monitoring device 110 includes the at least one microphone 116, discussed above, that is connected to the processor 200 (e.g., via I2S). The microphone 116 comprises any type of acoustic sensor configured to record sounds within the cabin 104. In at least one embodiment, the monitoring device 110 comprises at least two microphones 116 spaced apart from one another so as to record stereo audio of the cabin 104. In one embodiment, the microphone(s) 116 take the form of Micro-Electro-Mechanical Systems (MEMS) microphones mounted directly on a printed circuit board of the processor and/or system on a chip 200.

In some embodiments, the monitoring device 110 includes an inertial measurement unit (IMU) 214 that is connected to the processor 200 (e.g., via SPI). The IMU 214 operates as both an accelerometer and a gyroscope and may include a discrete accelerometer and a discrete gyroscope, or a single combined sensor that provides both acceleration and gyroscopic measurements. The accelerometer may, for example, be a 16-bit digital triaxial accelerometer with ±16 g and up to 1.6 kHz data rate. The gyroscope may, for example, be a 16-bit digital triaxial gyroscope with up to ±2000 dps and up to 6.4 kHz data rate. In one embodiment, the IMU 214 further includes an embedded temperature sensor that is leveraged for thermal protection features.

In some embodiments, the monitoring device 110 includes a cellular and Global Navigation Satellite System (GNSS) module 216 that is connected to the processor 200 (e.g., via USB). The cellular and GNSS module 216 provides both cellular connectivity and global position measurement for the monitoring device 110. However, separate modules for cellular telephony and GNSS can be similarly utilized. The cellular and GNSS module 216 comprises a cellular transceiver including a cellular telephony modem (e.g., category four LTE), a main antenna 218, a diversity antenna 220, and a subscriber identification module (SIM) card 222, as well as any other processors, memories, oscillators, or other hardware conventionally included in a cellular module. In one embodiment, the cellular telephony modem is configured to provide echo cancellation and noise reduction. The cellular and GNSS module 216 further comprises a GNSS receiver, a Low Noise Amplifier (LNA) & Surface Acoustic Wave (SAW) filter module 224, and a flex antenna 226, as well as any other processors, memories, oscillators, or other hardware conventionally included in a GNSS module. In one embodiment, the GNSS receiver supports the GPS, GLONASS, BeiDou, and Galileo systems and provides location data with an accuracy of ±5 m.

In one embodiment, the monitoring device 110 is configured to utilize sensor fusion (dead reckoning) of the GNSS data with the IMU data in order to improve location measurement quality in challenging GNSS reception scenarios and to bridge GNSS reception gaps. In one embodiment, the monitoring device 110 provides the dead reckoned GNSS location data to the personal electronic device 130 via Bluetooth, as well as the measured vehicle speed and vehicle heading and a device ID of the monitoring device 110.

In some embodiments, the monitoring device 110 includes Bluetooth module 228 that is connected to the processor 200 (e.g., via UART). The Bluetooth module 228 comprises a Bluetooth transceiver and a Bluetooth antenna 230, as well as any other processors, memories, oscillators, or other hardware conventionally included in a Bluetooth module. In at least one embodiment, the Bluetooth module 228 utilizes the Bluetooth Low Energy (BLE) specification (e.g., Bluetooth version 4.0 or later). In one embodiment, the Bluetooth antenna 230 is a PCB mounted antenna.

In some embodiments, the monitoring device 110 includes an LED driver 232, which is connected to the processor 200 (e.g., via I2C), that drives one or more illumination devices 234. The illumination devices 234 may include a plurality of LED status indicators configured to indicate a status, mode, or operation of the monitoring device 110, including a power indicator, a pairing indicator, and a recording indicator. Additionally, the illumination devices 234 may include an array of RGB LEDs and/or white LEDs configured to backlight a branded sign configured to display a trademark or logo of the mobility service provider (e.g., in the form of a plastic lens). Alternatively, an LCD screen or equivalent display screen can be included to display any trademark, logo, or other information to riders or outside pedestrians.

In some embodiments, the monitoring device 110 includes a speaker driver 236, which is connected to the processor 200 (e.g., via I2S), and that drives a corresponding speaker 238. In some embodiments, the monitoring device 110 includes a plurality of temperature sensors to ensure the safety of the internal components. Particularly, the monitoring device 110 monitors the temperature at multiple locations of the device and will safely shutdown if it's internal temperature is too high.

In at least one embodiment, the monitoring device 110 is provided with protective outer shell or housing (not shown) designed to retain and protect the various sensors and other electronic components within the housing. The housing comprises any number of shapes, configurations, and/or materials. In one embodiment, the housing is configured to engage with a mount that is semi-permanently attached to a surface such as a dash or windshield of the vehicle 102 to allow for retrofit installations. Alternatively, the housing itself may include some other mechanism, such as a suction cup or adhesive, for semi-permanent attachment. However, as noted above, in some embodiments, the monitoring device 110 the monitoring device 110 may be natively or otherwise integrated with the vehicle 102 and the components thereof may be distributed throughout the vehicle 102.

Finally, the monitoring device 110 includes a power supply 240 having suitable power electronics configured to provide the required output voltages for the various components of the monitoring device 110 (e.g., 4.2 Volts, 4.0 Volts, 3.3 Volts, 2.8 Volts, 1.8 Volts, 1.2 Volts, 1.1 Volts, 0.75 Volts, and 0.6 Volts). The power supply 240 is operably connected to a battery 242 having, for example, a capacity of 1000 mAh, and includes suitable power electronics configured for drawing power from the battery 242, as well as for charging the battery 242. Thus, the power supply 240 is configured to also receive input power from a power source 244, such as a 12V vehicle accessory voltage. To this end, the power supply 240 may connect directly to a cigarette lighter of the vehicle 102. However, in alternative embodiments, the power supply 240 may connect to a USB jack of the vehicle 102 or be directly connected to a vehicle accessory voltage line. In one embodiment, a power connection to the vehicle 102 is integrated with the mount for the monitoring device 110, such that the monitoring device 110 only receives power from the vehicle 102 when it is engaged with the mount. The power supply 240 is operably connected to a power switch 246 of the monitoring device and configured to turn the monitoring device 110 on and off in accordance with an actuation or state of the power switch 246.

The monitoring device 110 is configured to operate in a variety of different modes. In a Normal Mode, the monitoring device 110 is connected to power via the mount and paired with the mobility service provider application on the personal electronic device 130. In some embodiments, in the Normal Mode, the sensors are active and recording data to the data ring buffers, as discussed in greater detail below. When the monitoring device 110 is not connected to power via the mount, it operates in one or more Battery Operation Modes. Particularly, the monitoring device 110 does not run in the Normal Mode while using battery power. The battery operation modes are included to ensure that data is protected in the event of a power loss during an active ride.

In some embodiments, in a Network Polling Mode, the monitoring device 110 operates using battery power and waits in an ultra-low power mode. In the ultra-low power mode the monitoring device 110 wakes up once every hour, checks the network for messages, and then shuts down. The monitoring device 110 polls for a minimum of amount of time (e.g., 2 weeks) or until the battery falls below a specified state of charge. In one embodiment, a tiered polling period is be used in order to balance battery life with cost and data availability. For example, the monitoring device 110 wakes up once every hour for a period of one week and then wakes up once every day for a period of one month. Network polling periods can be adjusted to balance battery life with cost.

In some embodiments, in a Remote Wake-up Mode, if the monitoring device 110 sees a message on the network indicating the device should wake up while in Network Polling Mode, the monitoring device 110 turns on, takes the instructed action (e.g., uploads requested ride data chunks, with a maximum of 30 minutes of ride data chunks), and shuts down again. In this mode, the monitoring device 110 does not turn sensors or LEDs on and is silent.

In some embodiments, in a Last Gasp Mode, if the power cable is unplugged during an active ride, the monitoring device 110 transitions to battery power, finishes recording the current ride data chunk (discussed in more detail below), stops recording from all sensors, notifies the cloud storage backend 120, notifies the mobility service provider, uploads the last three ride data chunks, and safely shuts down.

In some embodiments, in a Safe Shutdown Mode, if the power cable is unplugged during while not in an active ride, the monitoring device 110 transitions to battery power, finishes recording the current ride data chunk, stops recording from all sensors, notifies the cloud storage backend 120, and safely shuts down.

In some embodiments, in an Installation Support Mode, the monitoring device 110 facilitates driver installation with the proper fields of view for the cameras, which is assisted by the mobility service provider application. The Installation Support Mode may be triggered via cloud storage backend 120 or the mobility service provider application. The monitoring device 110 captures images from both the interior and exterior camera and provides the images to the mobility service provider application for viewing thereat during installation of the monitoring device 110. The mobility service provider application or the monitoring device 110 provides installation feedback to assist the user in properly aligning the cameras.

In some embodiments, the monitoring device 110 is configured to receive over-the-air (OTA) updates. The updates come in two forms: Software Over-The-Air (SOTA) that target the application layer of the monitoring device 110 to ensure operational features can be updated and Firmware Over-The-Air (FOTA) that target lower level software of the monitoring device 110. The focus of these updates may be to deal with more critical software updates, for instance, related to any security measures within the software itself. The frequency of updates and when in the device life-cycle these updates may vary. SOTA/FOTA updates are protected to ensure their security and validity. In addition to transport over a secured communication channel, updates are encrypted and signed, and the device will reject any unauthorized updates. Further, anti-rollback will prevent any older software releases that may lack patches or critical fixes from being loaded onto the device.

In some embodiments, the monitoring device 110 is configured prevent local access or removal of ride data from the monitoring device 110 and includes hardware fails-safes and device tamper detection features. Particularly, the monitoring device 110 is configured support multiple layers of security to ensure sensor data cannot leave the device locally, with a combination of hardware, software, and hardware-assisted software features.

In one embodiment, the monitoring device 110 supports Secure boot (also known as High-Assurance Boot (HAB)) to ensure only authorized software can run on the device, and establish a root-of-trust for the system.

In one embodiment, the monitoring device 110 supports a One-Time-Programmable (OTP) key capability for secure boot key authenticity check, and the ability to rollback and change even the lowest level most critical keys within the system. An OTP memory is used for a device serial number and certain keys that don't change over the lifetime of the device.

In one embodiment, the monitoring device 110 supports an integrity-check of the OS to guard against any attempted rooting of the system should an intrusion occur. As part of a diagnostic health check, a device integrity check is performed to report the software version and integrity of the device on a routine basis, to ensure the device can still be trusted and is operating as intended.

In one embodiment, the monitoring device 110 supports secure storage via a Trusted Execution Environment (TEE) file system for all certificates, and for transient storage of encryption keys and related material. TEE protected operation is also used during booting of the system, and for certain critical security operations. TEE provides hardware-assisted protection and isolation from the remainder of the operating system to make any penetration extremely difficult.

In one embodiment, the monitoring device 110 supports hardware features, such as the Cryptographic Acceleration, which provide hardware-assisted acceleration for AES symmetric encryption of audio and video data. Similarly, the hardware provides support for RSA asymmetric encryption and SHA hashing for Public Key Infrastructure (PKI) and related signing/certificate operations. Hardware-assisted encryption combined with specialized cores allow for high-throughput audio and video capture and encryption as a tightly coupled operation, which can be protected at a process and policy level within the operating system. With sensitive private data encrypted as close to acquisition as possible, this dramatically reduces opportunities for hacking attempts or software faults to compromise any data.

In one embodiment, the monitoring device 110 utilizes a True Random Number Generator (TRNG) as a hardware feature provides the entropy that helps ensure cryptographic keys are secure and resistant to any brute-force attacks.

In one embodiment, the monitoring device 110 supports debug interface disablement (e.g. JTAG, USB, etc.) is done at low-level in the system to ensure any attempt to dismantle a device won't reveal an interface that can be used to attack the system.

In one embodiment, the monitoring device 110 supports DRAM scrambling protects the system memory and fortifies the system while in-operation against attempts to listen into and steal data, or as a method of side-channel attacks.

The communications modules of the monitoring device 110 utilize similar security features (secure boot, one-time-programmable keys), to ensure communication security. Further, Transport Layer Security (TLS) protocols, firewalls, and operating system policies, are used to ensure that the modem communicates exclusively with the cloud storage backend 120, and is resistant to any attempt by hackers to use the network connection as an attack channel to penetrate the system.

An in-house Key Management System (KMS) tightly controls the generation and injecting of keys at manufacturing assembly. A high level of coordination between the cloud storage backend 120 and the manufacturing site of the monitoring device 110 ensures no keys are compromised in any devices. Similarly, access to the signing keys needed to sign software to load and execute on devices is rigorously controlled via smartcards and internal logging procedures.

Cloud Storage Backend

Figure 3A:
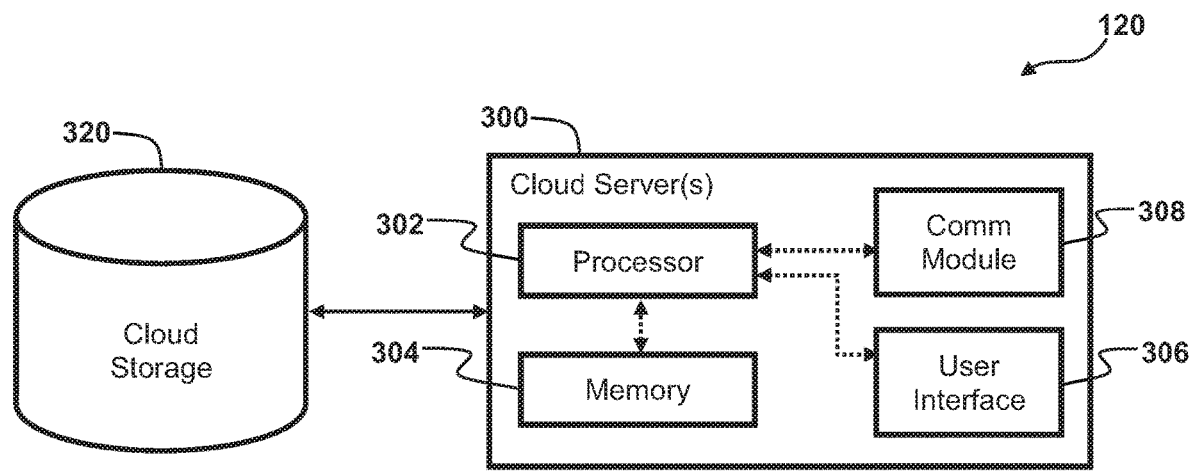
FIG. 3A shows exemplary hardware components of the cloud storage backend.
Figure 3B:
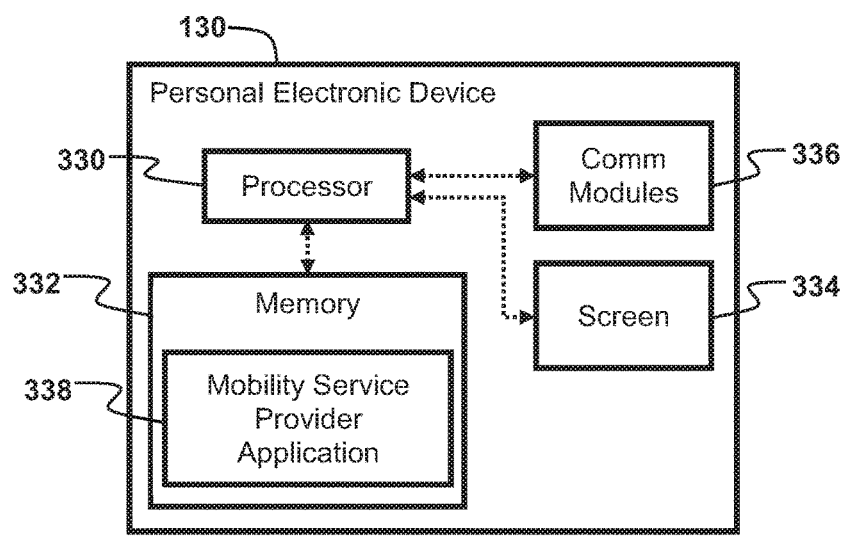
FIG. 3B shows exemplary hardware components of the personal electronic device.

With reference now to FIGS. 3A-3B, exemplary components of the cloud storage backend 120 and of the personal electronic device 130 are described. It will be appreciated that the components of the cloud storage backend 120 and of the personal electronic device 130 shown and described herein are merely exemplary and that the cloud storage backend 120 and of the personal electronic device 130 may comprise any alternative configuration.

As shown in FIG. 3A, the exemplary embodiment of the cloud storage backend 120 comprises one or more cloud servers 300 and one or more cloud storage devices 320. The cloud servers 300 may include servers configured to serve a variety of functions for the cloud storage backend, including web servers or application servers depending on the features provided by cloud storage backend 120, but at least include one or more database servers configured to manage ride data received from the monitoring device 110 and stored in the cloud storage devices 320. Each of the cloud servers 300 includes, for example, a processor 302, a memory 304, a user interface 306, and a network communications module 308. It will be appreciated that the illustrated embodiment of the cloud servers 300 is only one exemplary embodiment of a cloud server 300 and is merely representative of any of various manners or configurations of a personal computer, server, or any other data processing systems that are operative in the manner set forth herein.

The processor 302 is configured to execute instructions to operate the cloud servers 300 to enable the features, functionality, characteristics and/or the like as described herein. To this end, the processor 302 is operably connected to the memory 304, the user interface 306, and the network communications module 308. The processor 302 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 302 may include a system with a central processing unit, graphics processing units, multiple processing units, dedicated circuitry for achieving functionality, programmable logic, or other processing systems.

The cloud storage devices 320 are configured to store ride data received from the monitoring device 110. The cloud storage devices 320 may be of any type of long-term non-volatile storage device capable of storing information accessible by the processor 302, such as hard drives or any of various other computer-readable storage media recognized by those of ordinary skill in the art. Likewise, the memory 304 is configured to store program instructions that, when executed by the processor 302, enable the cloud servers 300 to perform various operations described herein, including managing the ride data stored in the cloud storage devices 320. The memory 304 may be of any type of device or combination of devices capable of storing information accessible by the processor 302, such as memory cards, ROM, RAM, hard drives, discs, flash memory, or any of various other computer-readable media recognized by those of ordinary skill in the art.

The network communications module 308 of the cloud servers 300 provides an interface that allows for communication with any of various devices, at least including the monitoring device 110. In particular, the network communications module 308 may include a local area network port that allows for communication with any of various local computers housed in the same or nearby facility. Generally, the cloud servers 300 communicate with remote computers over the Internet via a separate modem and/or router of the local area network. Alternatively, the network communications module 308 may further include a wide area network port that allows for communications over the Internet. In one embodiment, the network communications module 308 is equipped with a Wi-Fi transceiver or other wireless communications device. Accordingly, it will be appreciated that communications with the cloud servers 300 may occur via wired communications or via the wireless communications. Communications may be accomplished using any of various known communications protocols.

The cloud servers 300 may be operated locally or remotely by an administrator. To facilitate local operation, the cloud servers 300 may include a user interface 306. In at least one embodiment, the user interface 306 may suitably include an LCD display screen or the like, a mouse or other pointing device, a keyboard or other keypad, speakers, and a microphone, as will be recognized by those of ordinary skill in the art. Alternatively, in some embodiments, an administrator may operate the cloud servers 300 remotely from another computing device which is in communication therewith via the network communications module 308 and has an analogous user interface.

The cloud storage backend 120 is configured to store and manage the ride data on the cloud storage devices 320 in a secure way and provide access to the ride data to the mobility service provider, as well as authorized third parties, via a web interface or API that includes controlled access and identity management. To this end, in at least some embodiments the cloud storage backend 120 is in bi-directional communication with a backend of the mobility service provider.

Driver's Personal Electronic Device

As shown in FIG. 3B, the exemplary embodiment of the personal electronic device 130 comprises a processor 330, a memory 332, a display screen 334, and at least one network communications module 336. The processor 330 is configured to execute instructions to operate the personal electronic device 130 to enable the features, functionality, characteristics and/or the like as described herein. To this end, the processor 330 is operably connected to the memory 332, the display screen 334, and the network communications module 336. The processor 330 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 330 may include a system with a central processing unit, graphics processing units, multiple processing units, dedicated circuitry for achieving functionality, programmable logic, or other processing systems.

The memory 332 is configured to store data and program instructions that, when executed by the processor 330, enable the personal electronic device 130 to perform various operations described herein. The memory 332 may be of any type of device capable of storing information accessible by the processor 330, such as a memory card, ROM, RAM, hard drives, discs, flash memory, or any of various other computer-readable medium serving as data storage devices, as will be recognized by those of ordinary skill in the art.

The display screen 334 may comprise any of various known types of displays, such as LCD or OLED screens. In some embodiments, the display screen 334 may comprise touch screens configured to receive touch inputs from a user. Alternatively or in addition, the personal electronic device 130 may include additional user interfaces, such as a buttons, switches, a keyboard or other keypad, speakers, and a microphone.

The network communications module 336 may comprise one or more transceivers, modems, processors, memories, oscillators, antennas, or other hardware conventionally included in a communications module to enable communications with various other devices, at least including the monitoring device 110. Particularly, the network communications module 336 generally includes a Bluetooth® module (not shown) configured to enable communication the monitoring device 110. Additionally, the network communications module 336 generally includes a Wi-Fi module configured to enable communication with a Wi-Fi network and/or Wi-Fi router (not shown), as well as one or more cellular modems configured to communicate with wireless telephony networks.

The personal electronic device 130 may also include a respective battery or other power source (not shown) configured to power the various components within the personal electronic device 130. In one embodiment, the battery of the personal electronic device 130 is a rechargeable battery configured to be charged when the personal electronic device 130 is connected to a battery charger configured for use with the personal electronic device 130.

In at least one embodiment, the memory 332 stores a mobility service provider application 338. As noted above, non-limiting examples of similar mobility service provider applications include the "Lyft Driver" application by Lyft™ and the "Uber Driver" application by Uber™, which are available on many smart phone and tablet computing platforms. However, it should be appreciated that the versions of these applications existing at the time of this disclosure do not necessarily operate in the manner described herein and the descriptions of mobility service provider application 338 should not be understood as descriptions of these exemplary similar mobility service provider applications.

As discussed in further detail below, the processor 330 is configured to execute program instructions of the mobility service provider application 338 to provide mobility services, in particular to provide rides to riders. Additionally, in some embodiments, the processor 330 is configured to execute program instructions of the mobility service provider application 338 to communicate useful metadata about each particular ride to the monitoring device 110. Alternatively, the memory 332 may store a further intermediary application that is executed by the processor 330 to receive the useful metadata about each particular ride from mobility service provider application 338 or from an associated cloud backend service of the mobility service provider, and then communicate the useful metadata about each particular ride to the monitoring device 110.

Methods for Monitoring Rides of a Mobile Service Provider

A variety of methods and processes are described below for operating the monitoring device 110, the cloud storage backend 120, and the personal electronic device 130. In these descriptions, statements that a method, processor, and/or system is performing some task or function refers to a controller or processor (e.g., the processor 200 of the monitoring device 110, the processor 302 of the cloud storage backend 120, or the processor 330 of the personal electronic device 130) executing programmed instructions stored in non-transitory computer readable storage media (e.g., the memories 202, 204 of the monitoring device 110, the memory 304 of the cloud storage backend 120, or the memory 332 of the personal electronic device 130) operatively connected to the controller or processor to manipulate data or to operate one or more components in the system 100 to perform the task or function. Additionally, the steps of the methods may be performed in any feasible chronological order, regardless of the order shown in the figures or the order in which the steps are described.

Figure 4:
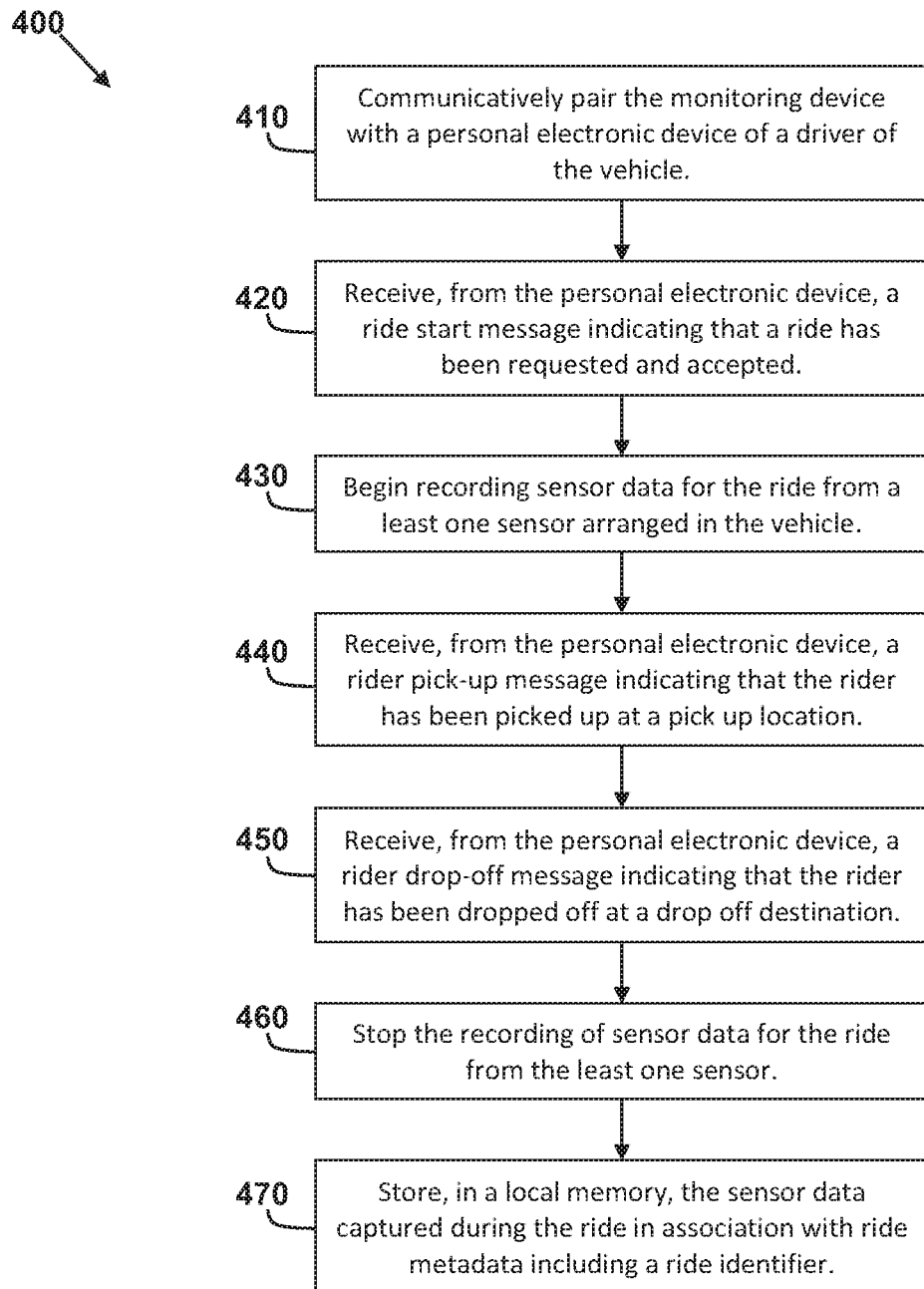
FIG. 4 shows a method for operating the monitoring device to monitor a ride in which a driver of a vehicle picks up a rider at a pickup location and drives the rider to a drop off destination.

FIG. 4 shows a method 400 for operating the monitoring device 110 to monitor a ride in which a driver of a vehicle picks up a rider at a pickup location and drives the rider to a drop off destination. The method advantageously captures, and stores in non-volatile memory, sensor data during a particular ride and annotates the sensor data with useful metadata about the particular ride. For example, sensor data captured during a ride may be stored with metadata identifying the particular ride, driver, and rider, and with timestamps identifying a ride hail/start time, a rider pick-up time, and rider drop-off time.

The method 400 begins with a step of communicatively pairing the monitoring device with a personal electronic device of a driver of the vehicle (block 410). Particularly, in at least one embodiment, the processor 200 of the monitoring device 110 operates the Bluetooth module 228 to communicatively pair with the Bluetooth module of the personal electronic device 130. This pairing process can be achieved in a variety of known methods using one or more buttons or other user interfaces of the monitoring device 110 and of the personal electronic device 130. Moreover, it will be appreciated by those of ordinary skill in the art that the monitoring device 110 and of the personal electronic device 130 can be communicatively paired using other communication methods aside from Bluetooth, such as Wi-Fi, ZigBee, Z-Wave, and conventional radio. Additionally, in some embodiments, the monitoring device 110 may be physically wired to the personal electronic device 110, for example by a USB connection or the like.

By way of the communicative pairing, the monitoring device 110 is able to exchange messages and other data with the personal electronic device 130. Particularly, the monitoring device 110 exchange messages and other data with the mobility service provider application 338 or other intermediary application on the personal electronic device 130 in order to obtain information about each particular ride provided by the driver using the mobility service provider application.

In one embodiment, in response to the personal electronic device 130 being paired with the monitoring device 110, the processor 200 operates a status indicator of the illumination devices 234 to indicate that the personal electronic device 130 being paired with the monitoring device 110.

After the personal electronic device 130 is paired with the monitoring device 110, the driver may begin operating the mobility service provider application 338 on the personal electronic device 130 to receive ride requests that are initiated by potential riders using a corresponding mobility service provider application on a personal electronic device of the rider. This phase in which the driver is ready and waiting for a ride request is referred to herein as Phase 1 (P1). In other words, the driver is logged into the mobility service provider application 338 but is waiting for a ride request. Upon receiving a ride request, the driver may accept the requested ride, thereby agreeing to perform the requested ride in exchange for a fare.

The method 400 continues with a step of receiving, from the personal electronic device, a ride start message indicating that a ride has been requested and accepted (block 420). Particularly, when the driver accepts a ride request, the processor 330 of the personal electronic device 130 operates the Bluetooth module thereof to transmit a ride start message to the monitoring device 110 and the processor 200, likewise, operates the Bluetooth module 228 to receive the ride start message. In at least one embodiment, the ride start message is transmitted by the personal electronic device 130 to monitoring device 110 immediately in response to the driver accepting the ride request and/or the driver otherwise being assigned the ride by the mobility service provider.

The ride start message indicates that a ride has been started by the driver and preferably includes a timestamp at which the ride was started. The ride start message may further include additional metadata such as a ride identifier that identifies the particular unique ride (e.g., a ID number), a driver identifier that identifies the particular driver (e.g., a user name, ID number, email address, driver's license number, or similar identifying information), and a rider identifier that identifies the particular rider (e.g., a user name, account number, email address, or similar identifying information).

The phase in which the driver has been assigned a ride and is driving to pick up the rider is referred to herein as Phase 2 (P2). Thus, the ride start message notifies the monitoring device 110 of the transition from Phase 1 to Phase 2.

The method 400 continues with a step of beginning recording sensor data for the ride from a least one sensor arranged in the vehicle (block 430). Particularly, in response to the receiving the ride start message, the processor 200 begins recording/writing sensor data from the plurality of sensors to the non-volatile memory 204 in association with the ride. In some embodiments, the processor 200 may continuously record/write sensor data from the plurality of sensors to the volatile memory 202 or the non-volatile memory 204 in a short-term buffer, including during as Phase 1 (i.e., while no ride is being performed). However, in response to the receiving the ride start message, the processor 200 begins generating and storing ride data chunks in the non-volatile memory 204, which include sensor data having timestamps after the ride start time. These ride data chunks will be described in further detail elsewhere herein.

As described above, the plurality of sensors of the monitoring device 110 may comprise a variety of different sensor types, including the exterior camera 112, the interior camera 114, the at least one interior microphone 116, the GNSS module 216, and the IMU 214. Thus, the sensor data that is included in the ride data chunks may include video data, audio data, global positioning data, acceleration data, and orientation data.

In one embodiment, as the processor 200 begins recording/writing sensor data from the plurality of sensors to the non-volatile memory 204, the processor 200 operates a status indicator of the illumination devices 234 to indicate that the monitoring device 110 is recording ride data.

The method 400 continues with a step of receiving, from the personal electronic device, a rider pick-up message indicating that the rider has been picked up at a pick up location (block 440). Particularly, after accepting a ride request, the driver drives to a pick-up location at which the rider will get in the vehicle 102 to be transported to their final drop-off destination. When the driver arrives at the pick-up location and accepts the rider into the vehicle 102, the processor 330 of the personal electronic device 130 operates the Bluetooth module thereof to transmit a rider pick-up message to the monitoring device 110 and the processor 200, likewise, operates the Bluetooth module 228 to receive the rider pick-up message. In at least one embodiment, the rider pick-up message is transmitted by the personal electronic device 130 to monitoring device 110 immediately in response to the driver picking up the rider at the pick-up location or, more particularly, in response to the rider or the driver indicating via the respective mobility service provider application that pick-up has occurred.

The rider pick-up message indicates that the rider has been picked up by the driver and preferably includes a timestamp at which the rider was picked up. The rider pick-up message may further include additional metadata such as a ride identifier that identifies the particular unique ride (e.g., a ID number), a driver identifier that identifies the particular driver (e.g., a user name, ID number, email address, driver's license number, or similar identifying information), and a rider identifier that identifies the particular rider (e.g., a user name, account number, email address, or similar identifying information).

The phase in which the driver has a rider in the vehicle 102 and is travelling to the drop of destination is referred to herein as Phase 3 (P3). Thus, the rider pick-up message notifies the monitoring device 110 of the transition from Phase 2 to Phase 3.

The method 400 continues with a step of receiving, from the personal electronic device, a rider drop off message indicating that the rider has been dropped off at a drop-off destination (block 450). Particularly, after picking up the rider, the driver drives to an agreed upon drop-off destination at which the rider will disembark from the vehicle 102. When the driver arrives at the drop-off destination and the rider exits the vehicle 102, the processor 330 of the personal electronic device 130 operates the Bluetooth module thereof to transmit a rider drop-off message to the monitoring device 110 and the processor 200, likewise, operates the Bluetooth module 228 to receive the rider drop-off message. In at least one embodiment, the rider drop-off message is transmitted by the personal electronic device 130 to monitoring device 110 immediately in response to the rider being dropped off at the drop-off destination or, more particularly, in response to the rider or the driver indicating via the respective mobility service provider application that drop-off has occurred.

The rider drop-off message indicates that the rider has been dropped off by the driver and preferably includes a timestamp at which the rider was dropped off. The rider drop-off message may further include additional metadata such as a ride identifier that identifies the particular unique ride (e.g., a ID number), a driver identifier that identifies the particular driver (e.g., a user name, ID number, email address, driver's license number, or similar identifying information), and a rider identifier that identifies the particular rider (e.g., a user name, account number, email address, or similar identifying information).

After the rider is dropped off, the driver may again operate the mobility service provider application 338 on the personal electronic device 130 to receive ride requests that are initiated by other riders. Thus, the rider pick-up message notifies the monitoring device 110 of the transition from Phase 3 back to Phase 1.

The method 400 continues with a step of stopping the recording of sensor data for the ride from the least one sensor (block 460). Particularly, in response to the receiving the rider drop-off message, the processor 200 stops recording/writing sensor data from the plurality of sensors to the non-volatile memory 204 in association with the ride. As noted above, in some embodiments, the processor 200 may continue record/write sensor data from the plurality of sensors to the volatile memory 202 or the non-volatile memory 204 in a short-term buffer. However, in response to the receiving the rider drop-off message, the processor 200 stops generating and storing ride data chunks for the particular ride in the non-volatile memory 204 for sensor data having timestamps after the drop-off time.

The method 400 continues with a step of storing, in a local memory, the sensor data captured during the ride in association with ride metadata including a ride identifier (block 470). Particularly, when a particular ride has been completed, the processor 200 stores the generated ride data chunks for the particular ride in a ring buffer of the non-volatile memory 204 for long-term storage. It will be appreciated that the ride data chunks can, of course, be written directly to the ring buffer of the non-volatile memory 204 during the course of the particular ride and aren't necessarily placed into the ring buffer only after completion of the ride. The details of the ride data chunks and of the ring buffer are described in further detail below.

Local Data Management

The monitoring device 110 is configured to store ride data in the form of ride data chunks, each storing sensor data for a time period of predetermined or variable length (e.g., 30 seconds). Each ride data chunk is encrypted individually to ensure data integrity. Each ride data chunk can be uploaded to the cloud storage backend 120 independently from one another, which reduces cellular data usage and improves data availability in low connectivity situations. The ride data chunks for a particular ride can then be decrypted and recombined by the cloud storage backend 120.

Figure 5:
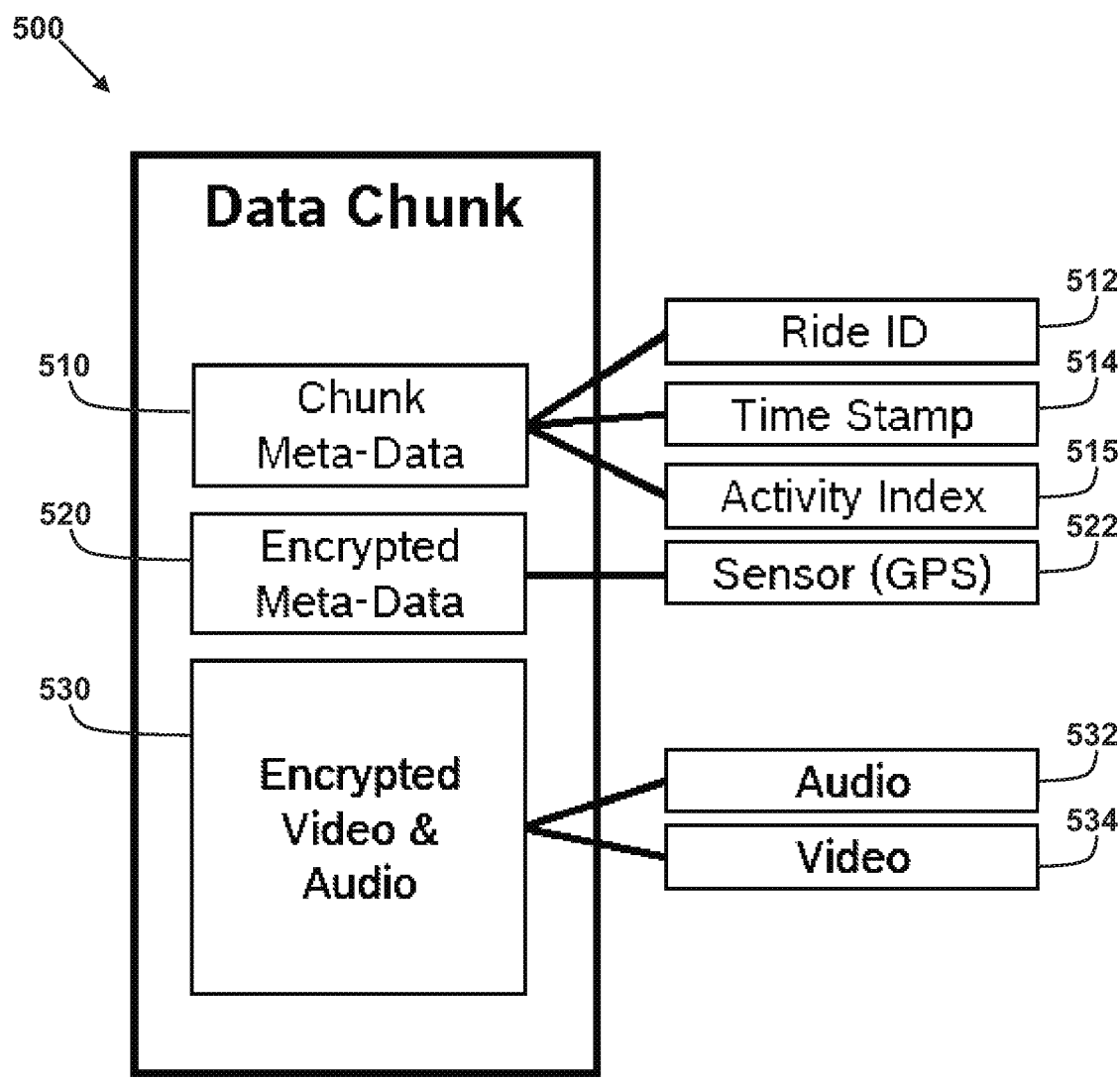
FIG. 5 shows a data structure for each ride data chunk stored by the monitoring device.

FIG. 5 shows an exemplary data structure 500 for each ride data chunk stored by the monitoring device 110. The ride data chunk includes chunk metadata 510, encrypted metadata 520, and encrypted sensor data 530 (encrypted video and audio, as illustrated). It will be appreciated by those of ordinary skill in the art that the term "metadata" refers to any data that describes or gives information about other data (e.g., the sensor data included in the ride data chunk).

The chunk metadata 510 includes the unencrypted metadata of the ride data chunk. In the illustrated embodiment, the chunk metadata 510 includes a Ride ID 512 which identifies the particular unique ride (e.g., a ID number) with which the ride data chunk is associated, timestamps 514 that identify starting and ending timestamps for the sensor data contained within the ride data chunk, and an activity index 515 that estimates an activity level within the cabin 104 of the vehicle 102 during the time period represented by the ride data chunk. The activity index is determined locally by the processor 200 and will be described in further detail elsewhere herein. The chunk metadata 510 may further a file size of the ride data chunk, a file pointer for the ride data chunk, and a universally unique identifier (UUID) for the ride data chunk. Finally, the chunk metadata 510 for each ride data chunk may further comprise additional header information including any additional information necessary to decrypt the ride data chunks and to reassemble the ride data from a set of sequential ride data chunks, for example by the cloud storage backend 120.

The encrypted metadata 520 includes the encrypted metadata of the ride data chunk, such as personally identifiable information or otherwise more sensitive metadata. In the illustrated embodiment, the encrypted metadata 520 at least includes global positioning data 522 recorded by the GNSS module 216 during the ride (e.g., a time series of latitude/longitude positions). The encrypted metadata 520 may further include additional ride metadata such as a driver identifier that identifies the particular driver (e.g., a user name, ID number, email address, driver's license number, or similar identifying information) and a rider identifier that identifies the particular rider (e.g., a user name, account number, email address, or similar identifying information). It should be appreciated that any of the metadata described herein may be included in either one of the chunk metadata 510 and the encrypted metadata 520, depending on privacy and searchability concerns.

Finally, the encrypted sensor data 530 includes the sensor data of the ride data chunk. In the illustrated embodiment, the encrypted sensor data 530 includes audio data 532 recorded by the microphone(s) 116 during the time period represented by the ride data chunk and video data 534 recorded by the front-facing exterior camera 112 and the cabin-facing interior camera 114 during the time period represented by the ride data chunk. In some embodiments, the encrypted sensor data 530 further includes sensor data recorded by other sensors during the time period represented by the ride data chunk, such as acceleration and gyroscopic data record by the IMU 214. Individual ride data chunks may include multiple types of sensor data or, in some embodiments, only one type of sensor data.

As alluded to above, in order to provide improved security, the processor 200 is configured to encrypt at least part of the data in each ride data chunk, i.e., the encrypted metadata 520 and the encrypted sensor data 530. Thus, the data structure 500 advantageously ensures data integrity by encrypting personally identifiable information. In at least one embodiment, the processor 200 includes hardware for cryptographic acceleration. In one embodiment, encryption keys are unique for each particular monitoring device 110, such that exposure of one key does not compromise data of another device. For similar reasons, in one embodiment, encryption keys are changed on a period basis.

The monitoring device 110 manages the ride data chunks stored on the local non-volatile memory 204 at variety of different levels to ensure that the collected sensor data is available when request within certain defined periods. Additionally, ride data chunks are managed between the local non-volatile memory 204 at the monitoring device 110 and the cloud storage devices 320 at the cloud storage backend 120 to ensure the highest possible data integrity and data availability.

The processor 200 implements one or more ring buffers (which may also be referred to as circular buffers, circular queues, or a cyclic buffers) on the local non-volatile memory 204 to manage storage of newly generated ride data chunks and the deletion of old ride data chunks. Each ring buffer is data structure comprising a predetermined number of elements which are written and replaced on a first-in, first-out (FIFO) basis. Each element of the ring buffer comprises a particular ride data chunk and/or an index/pointer reference to a particular ride data chunk stored in the non-volatile memory 204. As new ride data chunks are generated and written to the memory 204, the ring buffer is modified to delete the oldest ride data chunk and add the new ride data chunk. Thus, each ring buffer stores and/or refers to rides data chunks corresponding to a time period having a predetermined duration (i.e., the number of elements times the duration of an individual ride data chunk).

In one embodiment, the processor 200 implements different ring buffers of different lengths for different types of data. In this way, the most important types of data can be stored for the longest period of time, and less important types of data can be stored for a shorter period of time. For example, in one embodiment, a first ring buffer can be implemented for storing video data from the front-facing exterior camera 112 that has a predetermined first length (e.g., 2 hours). A second ring buffer can be implemented for storing video data from the cabin-facing interior camera 114 that has a predetermined second length (e.g., 48 hours). A third ring buffer can be implemented for storing audio data of the microphone(s) 116 that has a predetermined third length (e.g., 48 hours). A fourth ring buffer is implemented for storing metadata (e.g., any of the chunk metadata 510 or encrypted metadata 520 discussed above) that has a predetermined fourth length (e.g., 48 hours).

In one embodiment, if the monitoring device 110 is offline for a predetermined amount of time, the monitoring device 110 is configured to wake up and erase any expired data from the ring buffers.

In some embodiments, in addition to the ring buffers, the processor 200 implements a safe storage table or other data structure configured to identify ride data chunks or portions thereof that are not to be deleted for at least a predetermined amount of time. In response to particular conditions or triggering events, the processor 200 moves certain ride data chunks and/or the index/pointer references to certain ride data chunks from the ring buffers to a separate safe storage table, which is separate from the ring buffers. As a result, these ride data chunks will be deleted by the ring buffers, and will instead be stored according to the rules of the safe storage table.

The safe storage table is a data structure comprising an arbitrary number of elements which are stored for a predetermined amount of time, which is generally much longer than that of the ring buffers (e.g., 30 days). Much like the ring buffers, each element of the safe storage table comprises a particular ride data chunk and/or an index/pointer reference to a particular ride data chunk stored in the non-volatile memory 204. After expiration of the predetermined amount of time for the safe storage table (e.g., 30 days), the processor 200 deletes the ride data chunks from the safe storage table, thus allowing for those ride data chunks to be deleted from the non-volatile memory 204. The various conditions and triggering events that will cause a ride data chunk or certain data from a certain ride data chunk to be moved from the ring buffer into the safe storage table will be described in greater detail elsewhere herein.

Selective Upload of Ride Sensor Data to the Cloud Storage Backend

As mentioned above, the monitoring device 110 is advantageously configured to upload ride data to the cloud storage backend 120 in response to a limited set of triggering events. Otherwise, ride data is only stored locally and is eventually deleted as a matter of course. In this way, the monitoring device 110 maximizes the privacy of the drivers and riders because ride data is never uploaded to the cloud storage backend 120 for the majority of rides in which no dispute or other anomalous event occurs.

In response to one of the limited set of triggering events occurring with respect to a particular ride, the processor 200 of the monitoring device 110 operates the cellular transceiver of the cellular and GNSS module 216 to begin uploading ride data chunks associated with the particular ride to the cloud storage backend 120 and, likewise, the processor 302 of the cloud storage backend 120 operates the network communications module(s) 308 to receive the ride data chunks associated with the particular ride. In one embodiment, each ride data chunk is uploaded individually by the monitoring device 110 and the processor 302 of the cloud storage backend is configured to decrypt each ride data chunk and recombine the sensor data of the ride data chunks.

In one embodiment, the limited set of triggering events includes an accident occurring during the particular ride. Particularly, the processor 200 monitors the sensor data stream of the IMU 214 and detects that an accident has occurred during a ride in response to acceleration data exceeding an acceleration threshold and/or a deceleration threshold (e.g., ±2G). Other factors may be taken into consideration to ensure a high confidence detection of an accident. In response to detecting the accident, the monitoring device 110 uploads to the cloud storage backend 120 some or all of the ride data chunks associated with the particular ride during which the accident occurred. In one embodiment, the monitoring device 110 immediately uploads only a subset of the ride data chunks or only a portion of certain ride data chunks corresponding to a predetermined time period (e.g., 30 seconds) around which the accident occurred. In one embodiment, the monitoring device 110 immediately uploads only certain types of sensor data (e.g., only video data). In one embodiment, the monitoring device 110 moves the remaining ride data chunks of the ride or remaining portions of the ride data chunks of the ride that are not yet uploaded from the ring buffers to the safe storage table, so that these ride data chunks will remain available for a longer period of time in the event that they are later requested by the mobility service provider for review. In one embodiment, the monitoring device 110 moves only certain types of sensor data (e.g., only video data) into the safe storage table.

In one embodiment, the limited set of triggering events includes the driver or the rider requesting that the ride data be uploaded with respect to the particular ride. Particularly, in some cases, the driver or the rider can request that the ride data of a particular ride be uploaded to the cloud storage backend 120, for example by interacting with the mobility service provider application(s). If such a request is made, an upload request message is received by the monitoring device 110 from the mobility service provider by way of the cloud storage backend 120 via the cellular transceiver of the cellular and GNSS module 216 or by way of the mobility service provider application 338 of the personal electronic device 130 via the Bluetooth module 228.

In one embodiment, the limited set of triggering events includes a support ticket being submitted to the mobility service provider by the driver or the rider with respect to the particular ride. Particularly, in some cases, the driver or the rider submit a support ticket indicating a dispute of some kind about a particular ride, for example by interacting with the mobility service provider application(s). If such a request is made, an upload request message is received by the monitoring device 110 from the mobility service provider by way of the cloud storage backend 120 via the cellular transceiver of the cellular and GNSS module 216 or by way of the mobility service provider application 338 of the personal electronic device 130 via the Bluetooth module 228.

In one embodiment, the limited set of triggering events includes a backend request being received from the mobility service provider. Particularly, in some cases, the mobility service provider may request upload of ride data regarding a particular ride for some other reason (e.g., a driver deviates from route). If such a request is made, an upload request message is received by the monitoring device 110 from the mobility service provider by way of the cloud storage backend 120 via the cellular transceiver of the cellular and GNSS module 216 or by way of the mobility service provider application 338 of the personal electronic device 130 via the Bluetooth module 228.

In response to receiving any of the upload request messages described above, the monitoring device 110 uploads to the cloud storage backend 120 some or all of the ride data chunks associated with the particular ride. In one embodiment, the monitoring device 110 immediately uploads only a subset of the ride data chunks or only certain types of sensor data (e.g., only video data). In one embodiment, the monitoring device 110 moves the remaining ride data chunks of the ride or remaining portions of the ride data chunks of the ride that are not yet uploaded from the ring buffers to the safe storage table. In one embodiment, the monitoring device 110 moves only certain types of sensor data (e.g., only video data) into the safe storage table.

In some cases, one of the limited set of triggering events may occur at a time in which the monitoring device 110 cannot upload ride data chunks to the cloud storage backend 120, such as when the monitoring device 110 has weak cellular connectivity with the cloud storage backend 120, no cellular connectivity at all, critically low battery, or some other circumstance in ride data chunks cannot be uploaded. In response to such a situation, the monitoring device 110 moves the ride data chunks of the particular ride during which the triggering event occurred from the ring buffers into the safe storage table, thereby ensuring that the ride data chunks will remain available for later upload. Once the ability to upload ride data chunks has been is re-established, the monitoring device 110 uploads the ride data chunks as described above. Once the ride data chunks are successfully uploaded, the monitoring device 110 removes them from the safe storage table and deletes them from the non-volatile memory 204.

In some cases, after an occurrence of one of the limited set of triggering events, the monitoring device 110 may be unable to successfully upload some of the ride data chunks due to a loss of cellular connectivity during the upload process. In response to such a situation, the monitoring device 110 moves the ride data chunks of the particular ride during which the triggering event occurred from the ring buffers into the safe storage table, thereby ensuring that the ride data chunks will remain available for later upload. Once cellular connectivity is re-established, the monitoring device 110 uploads the ride data chunks as described above. Once the ride data chunks are successfully uploaded, the monitoring device 110 removes them from the safe storage table and deletes them from the non-volatile memory 204.

In some cases, if too much data is moved into the safe storage table, the local non-volatile memory 204 may run low on storage space. In some embodiments, in response to a threshold amount of storage space being exceeded on the non-volatile memory 204, the monitoring device 110 is configured to upload some of the ride data chunks in the safe storage table to the cloud storage backend 120 for storage thereat in the cloud storage device 320. Upon successful upload to the cloud storage backend 120, the monitoring device 110 deletes the uploaded ride data chunks from the local non-volatile memory 204. After expiration of the predetermined amount of time for the safe storage table (e.g., 30 days), the processor 302 of the cloud storage backend 120 deletes the ride data chunks from the cloud storage device 320. In this way, availability of any ride data chunks that are moved to the safe storage table is maintained even if the local non-volatile memory 204 runs out of storage space.

Algorithmic Activity Level

As discussed above, in at least some embodiments, the chunk metadata 510 of the ride data chunks includes an activity index. The activity index provides an estimation of an activity level or an amount of activity within the cabin 104 of the vehicle 102 during the time period represented by the ride data chunk. The activity index can be used by the system 100 to identify ride data chunks that may pertain to events related to unwanted or inappropriate behavior, which can be leveraged to support data upload reduction and operation review time reduction.

The activity index is determined locally by the processor 200, preferably using a lightweight algorithm that does not require heavy processing or memory usage. Particularly, as the processor 200 receives sensor data from the plurality of sensors of the monitoring device 110, the processor 200 evaluates the incoming sensor data for particular features that may be associated with violence or other negative behaviors. In some embodiments, the processor 200 determines the activity index based on audio data captured by the microphone(s) 116 and based on video data captured by the cabin-facing interior camera 114. In some embodiments, the processor 200 determines separate activity indices for the audio data of the microphone(s) 116 and for the video data of the cabin-facing interior camera 114. In some embodiments, each activity index comprises a time series of numerical values representing the activity level each point in time during the time period represented by the ride data chunk. In most embodiments, the processor 200 does not label or identify particular types of activities. Therefore, the monitoring device 110 generally does not know what has occurred within the cabin 104.

In one embodiment, the processor 200 determines a video activity index that indicates an amount of activity in the video of the cabin 104, based on the video data of the cabin-facing interior camera 114. The processor 200 determines the video activity index, for example, based on an amount of motion in the video data detected, for example, according to an amount or rate of change in the visual information in the video data. More particularly, processor 200 may determine the video activity index based on an amount of motion in a middle region of the frame (i.e. a region between two riders or between the driver and the rider), which may correlate to physical violence. A variety of other features of the video data may be taken into consideration in determining the video activity index.

In one embodiment, the processor 200 determines an audio activity index that indicates an amount of activity in the audio of the cabin 104, based on the audio data of the microphone(s) 116. The processor 200 determines the audio activity index, for example, based on audio volume of the audio data. More particularly, processor 200 may determine the audio activity index based on a volume of the audio data in a predetermined range of frequencies associated with human speech, which may correlate to verbal arguments. A variety of other features of the audio data may be taken into consideration in determining the audio activity index.

Figure 6:
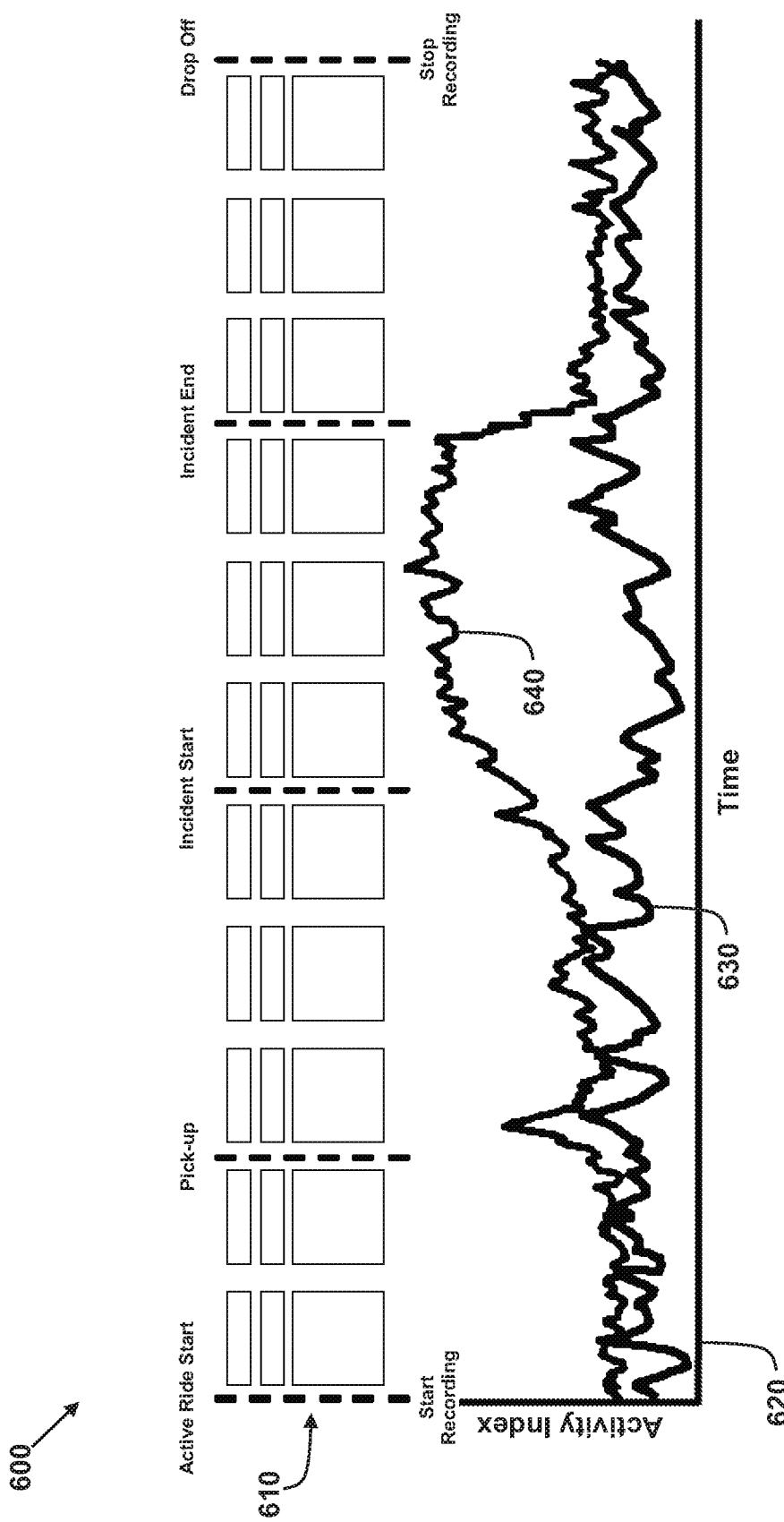
FIG. 6 shows a timeline including activity indices for an exemplary ride.

FIG. 6 shows a timeline 600 including activity indices for an exemplary ride. The timeline 600 includes a plurality of ride data chunks 610 that store sensor data for the ride. The timeline 600 further includes a graph 620, which plots the numerical activity level values of a video activity index 630 over time and the numerical activity level values of an audio activity index 640 over time. During the exemplary ride, an incident occurred in the middle of Phase 3 (i.e., between pick-up and drop-off). Particularly, an argument occurred between the rider and the driver or between one rider and another rider. As can be seen, the audio activity index 640 notably increased in value during the incident.

In one embodiment, in response to a ride data chunk having a highest activity index (e.g., top 20%) for the ride or having an activity index greater than a threshold, the processor 200 moves those ride data chunks and/or the index/pointer references to those ride data chunks from the ring buffers to the separate safe storage table.

In at least one embodiment, the cloud storage backend 120 is configured to provide more advanced processing of ride data chunks that are uploaded and stored in the cloud storage device 320. Particularly, in response to receiving a ride data chunk from the monitoring device 110, the processor 302 may process the sensor data thereof to determine additional metadata, such as identifying and labeling particular types of activities that occurred during the time period represented by the ride data chunk. This additionally metadata can assist in finding the particular moments within a ride that should be reviewed by the mobility service provider, reducing their need to view entire videos.

Review Request Process

Figure 7:
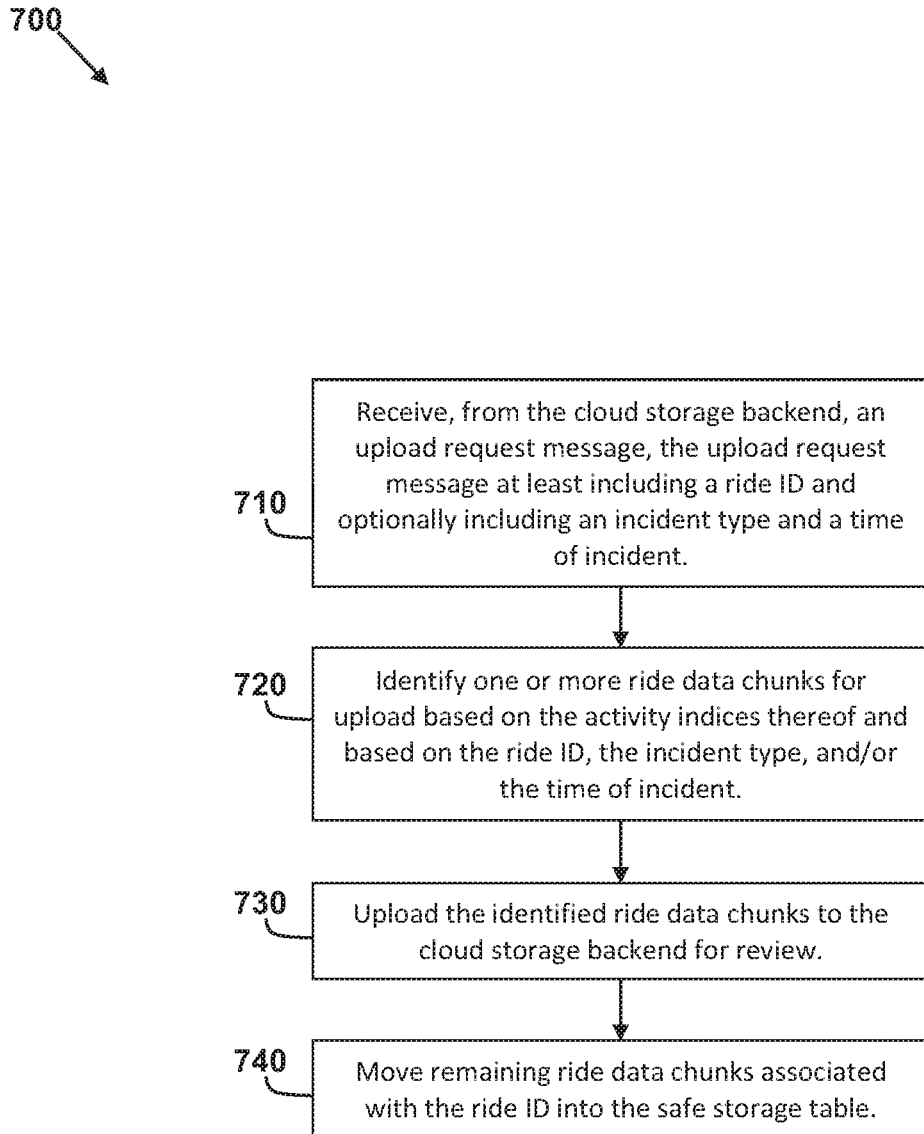
FIG. 7 shows a method for operating the monitoring device to upload one or more ride data chunks in response to a review request by the mobility service provider.

FIG. 7 shows a method 700 for operating the monitoring device 110 to upload one or more ride data chunks in response to a review request by the mobility service provider. The method advantageously leverages the locally determined activity indices to identify only the most relevant ride data chunks to upload for review by the mobility service provider, while also moving the remaining ride data chunks into the safe storage table for preservation in the event that more data is necessary. In this way, the monitoring device 110 reduces cellular data usage while maximizing data availability.

The method 700 begins with a step of receiving, from the cloud storage backend, an upload request message, the upload request message at least including a ride ID and optionally including an incident type and a time of incident (block 710). Particularly, when a review request is received by the cloud storage backend 120 from the mobility service provider, the processor 302 of the cloud storage backend 120 operates the network communications module 308 to transmit an upload request message to the monitoring device 110 and the processor 200, likewise, operates the cellular transceiver of the cellular and GNSS module 216 to receive the upload request message.

A review request may be sent to the cloud storage backend 120 by the mobility service provider for a variety of reasons. For example, as discussed above, the driver or the rider may request that the ride data be uploaded with respect to the particular ride, such as via the mobility service provider application. As another example, as discussed above, the driver or the rider may submit a support ticket to the mobility service provider with respect to the particular ride. Finally, as discussed above, the mobility service provider may request upload of ride data regarding a particular ride for some other reason (e.g., a driver deviates from route).

In any case, the review request received at the cloud storage backend 120 from the mobility service provider at least includes a ride identifier that identifies the particular unique ride (e.g., an ID number). The upload request message received by the monitoring device 110, likewise, at least includes the ride identifier.

Additionally, if available, the review request may also include an incident type that identifies the type of incident that occurred during the ride and which is selected from a defined set of known incident types. The defined set of known incident types may include, for example, argument between riders, physical violence between riders, argument between rider and driver, physical violence between rider and driver, vehicle accident, and rider damage to vehicle interior. The upload request message received by the monitoring device 110, likewise, includes the incident type if the review request included the incident type.

Finally, if available, the review request may also include a time of the incident that identifies approximately when the incident occurred during the ride. The time of the incident may, for example, be selected from a defined set of options, such as beginning, middle, or end of the ride. Alternatively, the time of the incident may include a specific time during the ride. The upload request message received by the monitoring device 110, likewise, includes the time of the incident if the review request included the time of the incident.

The method 700 continues with a step of identifying one or more ride data chunks for upload based on the activity indices thereof and based on the ride ID, the incident type, and/or the time of incident (block 720). Particularly, the processor 200 of the monitoring device 110 identifies the ride data chunks associated with the ride identified by the ride identifier in the upload request message. Next, the processor 200 identifies one or more of these ride data chunks, preferably a subset of all of the ride data chunks associated with the ride, to be uploaded in response to the upload request message. The processor 200 identifies the one or more ride data chunks to be uploaded based on the activity indices of the ride data chunks associated with the ride. In one embodiment, the processor 200 identifies those ride data chunks associated with the ride that have an activity index that exceed some predetermined threshold, and selects those to be uploaded. In one embodiment, the processor 200 identifies those ride data chunks associated with the ride that have the highest activity indices for the ride and selects a predetermined number or percentage (e.g., top 20%) of the ride data chunks having the highest activity indices to be uploaded.

If the upload request message includes an incident type that identifies the type of incident that occurred during the ride, then the processor 200 identifies the one or more ride data chunks to be uploaded based on the activity indices of the ride data chunks associated with the ride and based on the incident type. Particularly, for some types of incidents, the processor 200 identifies the one or more ride data chunks to be uploaded with greater weight given to activity indices for certain types of sensor data and lesser or no weight given to activity indices for certain other types of sensor data. For example, if the incident type indicates that an argument occurred, then the processor 200 identifies the one or more ride data chunks to be uploaded based only on the audio activity indices, ignoring the video activity indices. As another example, if the incident type indicates that physical violence occurred, then the processor 200 identifies the one or more ride data chunks to be uploaded with greater weight given to the video activity indices, and with lesser or no weight given to the audio activity indices. It will be appreciated by those of ordinary skill in the art that a wide variety of techniques can be applied to leverage knowledge of the type of incident to better identify the one or more ride data chunks to be uploaded.

If the upload request message includes a time of the incident that identifies approximately when the incident occurred during the ride, then the processor 200 identifies the one or more ride data chunks to be uploaded based on the activity indices of the ride data chunks associated with the ride and based on the time of the incident. Particularly, the processor 200 identifies the one or more ride data chunks to be uploaded as those that correspond to the time of the incident (e.g., beginning, middle, end, or specific time) and have highest activity indices (e.g., top 20%) or have activity indices greater than a threshold.

The method 700 continues with a step of uploading the identified ride data chunks to the cloud storage backend for review (block 730). Particularly, the processor 200 of the monitoring device 110 operates the cellular transceiver of the cellular and GNSS module 216 to upload the identified ride data chunks to the cloud storage backend 120 and, likewise, the processor 302 of the cloud storage backend 120 operates the network communications module(s) 308 to receive the ride data chunks associated with the particular ride. The processor 302 of the cloud storage backend 120 stores the received ride data chunks on the cloud storage devices 320, via which the ride data chunks are made available to the mobility service provider for review.

The method 700 continues with a step of moving remaining ride data chunks associated with the ride ID into the safe storage table (block 740). Particularly, the processor 200 of the monitoring device 110 moves the remaining ride data chunks of the ride that are not identified for uploaded in response to the upload request message from the ring buffers to the safe storage table, so that these ride data chunks will remain available for a longer period of time in the event that they are later requested by the mobility service provider for review. In the event that a further upload request message is received identifying the same ride, the monitoring device 110 may then upload all of the remaining ride data chunks.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A system for monitoring rides in a vehicle, the system comprising:
   a plurality of sensors arranged in the vehicle and configured to capture sensor data during the rides;
   a non-volatile memory configured to store data; and
   a processor operatively connected to the plurality of sensors, the first transceiver, and the memory, the processor being configured to:
      receive the sensor data from the plurality of sensors captured during a ride in which the driver picks up a rider at a pickup location and drives the rider to a drop-off destination;
      determine a first activity index indicating a first activity level within the vehicle during the ride based on first sensor data captured during the ride by a first sensor of the plurality of sensors;
      determine a second activity index indicating a second activity level within the vehicle during the ride based on second sensor data captured during the ride by a second sensor of the plurality of sensors;
      store, in the non-volatile memory, the sensor data captured during the ride, the first activity index and the second activity index being stored in metadata of the sensor data captured during the ride;
      receive, via the first transceiver, a request message from the remote server, the request message identifying the ride and a type of incident that occurred during the ride;
      identify, in response to receiving the request message identifying the ride, a first portion of the sensor data captured during the ride to be uploaded based on the first activity index and the second activity index, the first activity index and the second activity index being weighted differently depending on the type of incident;
      upload, via the first transceiver, the first portion of the sensor data captured during the ride to the remote server for review; and
      move, to a safe storage table in the non-volatile memory, a remaining portion of the sensor data captured during the ride that is not identified to be uploaded to the remote server.

2. The system of claim 1, wherein the first activity index is a time series of numerical values indicating the first activity level within the vehicle at respective times during the ride.

3. The system of claim 1, the processor being further configured to:
   implement, on the non-volatile memory, a data structure configured to store a subset of the sensor data sensor data that is not to be deleted for at least a predetermined amount of time;

identify a first portion of the sensor data captured during the ride to be moved into the data structure based on at least one of the first activity index and the second activity index; and move the first portion of the sensor data into the data structure.

4. The system of claim 1, the processor being further configured to:

implement, on the non-volatile memory, a data structure configured to store a subset of the sensor data sensor data that is not to be deleted for at least a predetermined amount of time; and move a second portion of the sensor data that is not identified to be uploaded to the remote server into the data structure.

5. The system of claim 1, wherein:

the first sensor is a first camera arranged in the vehicle and configured to capture video of an interior of the vehicle, the first sensor data including the video of the interior of the vehicle;

the second sensor is a microphone arranged in the vehicle and configured to capture audio of the interior of the vehicle, the second sensor data including the audio of the interior of the vehicle.

6. The system of claim 5, wherein the plurality of sensors further includes:

a second camera arranged in the vehicle and configured to capture video of an exterior of the vehicle in a driving direction of the vehicle.

7. The system of claim 1, wherein:

the request message received from the remote server further identifies a time of an incident that occurred during the ride; and the processor is further configured to identify the first portion of the sensor data captured during the ride to be uploaded based on the time of the incident and at least one of the first activity index and the second activity index.

8. A method for monitoring rides in a vehicle, the method comprising:

capturing, with a plurality of sensors arranged in the vehicle, sensor data during a ride in which a driver of the vehicle picks up a rider at a pickup location and drives the rider to a drop-off destination;

determining a first activity index indicating a first activity level within the vehicle during the ride based on first sensor data captured during the ride by a first sensor of the plurality of sensors;

determining a second activity index indicating a second activity level within the vehicle during the ride based on second sensor data captured during the ride by a second sensor of the plurality of sensors;

storing the sensor data captured during the ride in a non-volatile memory, the first activity index and the second activity index being stored in metadata of the sensor data captured during the rides;

receiving, via a first transceiver, a request message from a remote server, the request message identifying the ride and a type of incident that occurred during the ride;

identifying, in response to receiving the request message identifying the ride, a first portion of the sensor data captured during the ride to be uploaded based on the first activity index and the second activity index, the first activity index and the second activity index being weighted differently depending on the type of incident;

uploading, via the first transceiver, the first portion of the sensor data captured during the ride to the remote server for review; and move, to a safe storage table in the non-volatile memory, a remaining portion of the sensor data captured during the ride that is not identified to be uploaded to the remote server.

9. The method of claim 8, wherein the first activity index is a time series of numerical values indicating the first activity level within the vehicle at respective times during the ride.

10. The method of claim 8 further comprising:

implementing, on the non-volatile memory, a data structure configured to store a subset of the sensor data that is not to be deleted for at least a predetermined amount of time;

identifying a first portion of the sensor data captured during the ride to be moved into the data structure based on at least one of the first activity index and the second activity index; and moving the first portion of the sensor data into the data structure.

11. The method of claim 8, further comprising:

implementing, on the non-volatile memory, a data structure configured to store a subset of the sensor data sensor data that is not to be deleted for at least a predetermined amount of time; and moving a second portion of the sensor data that is not identified to be uploaded to the remote server into the data structure.

12. The method of claim 8, wherein:

the first sensor is a first camera arranged in the vehicle and configured to capture video of an interior of the vehicle, the first sensor data including the video of the interior of the vehicle;

the second sensor is a microphone arranged in the vehicle and configured to capture audio of the interior of the vehicle, the second sensor data including the audio of the interior of the vehicle.

13. The method of claim 12, wherein the plurality of sensors further includes:

a second camera arranged in the vehicle and configured to capture video of an exterior of the vehicle in a driving direction of the vehicle.

14. The method of claim 8, wherein the request message received from the remote server further identifies a time of an incident that occurred during the ride, the identifying the first portion of the sensor data further comprising:

identifying the first portion of the sensor data captured during the ride to be uploaded based on the time of the incident and at least one of the first activity index and the second activity index.

* * * * *